United States Patent [19]

de Massacré

[11] 4,050,144
[45] Sept. 27, 1977

[54] METHOD OF AND APPARATUS FOR REMOVING PUNCTURE-RESISTANT TUBES FROM TIRES

[75] Inventor: Guy de Massacré, Paris, France

[73] Assignee: Hutchinson-Mapa, Paris Cedex, France

[21] Appl. No.: 716,342

[22] Filed: Aug. 20, 1976

[30] Foreign Application Priority Data

Sept. 19, 1975 France .................................. 75.28719

[51] Int. Cl.² ............................................ B60C 25/00
[52] U.S. Cl. .......................................... 29/427; 29/235
[58] Field of Search ............... 29/426, 427, 235, 244, 29/252; 254/50.1, 50.2, 50.3, 50.4; 157/1, 1.1, 1.17, 1.21, 1.26, 1.28, 11, 1.2; 72/427

[56] References Cited

U.S. PATENT DOCUMENTS

| | | | |
|---|---|---|---|
| 1,459,693 | 6/1923 | Rand et al. | 29/427 X |
| 1,535,382 | 4/1925 | Taylor et al. | 254/50.4 X |
| 1,753,035 | 4/1930 | Weaver et al. | 254/50.3 |
| 2,479,432 | 8/1949 | Tillotson | 157/1.2 |
| 2,589,771 | 3/1952 | Campbell et al. | 254/50.3 |

*Primary Examiner*—Milton S. Mehr
*Attorney, Agent, or Firm*—Browdy and Neimark

[57] ABSTRACT

An apparatus for removing puncture-resistant tubes from tires includes two symmetrical squeezing plates, a jack located between these two plates, in a plane parallel to the lengthwise direction thereof and a base plate disposed transversely with respect to the squeezing plates, which base plate furnishes support for the squeezing plates and for a tire which is to have its associated puncture-resistant tube removed. An accommodation for the tire whose tube is to be removed, is delimited by the aforesaid squeezing plates, jack and base plate. A method of removing puncture-resistant tubes involves subjecting a tire containing a puncture-resistant tube simultaneously to a lateral squeezing action on two diametrically opposite zones thereof in a given plane, and to a first thrusting action on a zone thereof in a plane, perpendicular to the given plane, and then to a thrusting action on a zone opposite to the zone which was subjected to the first thrusting action.

9 Claims, 3 Drawing Figures

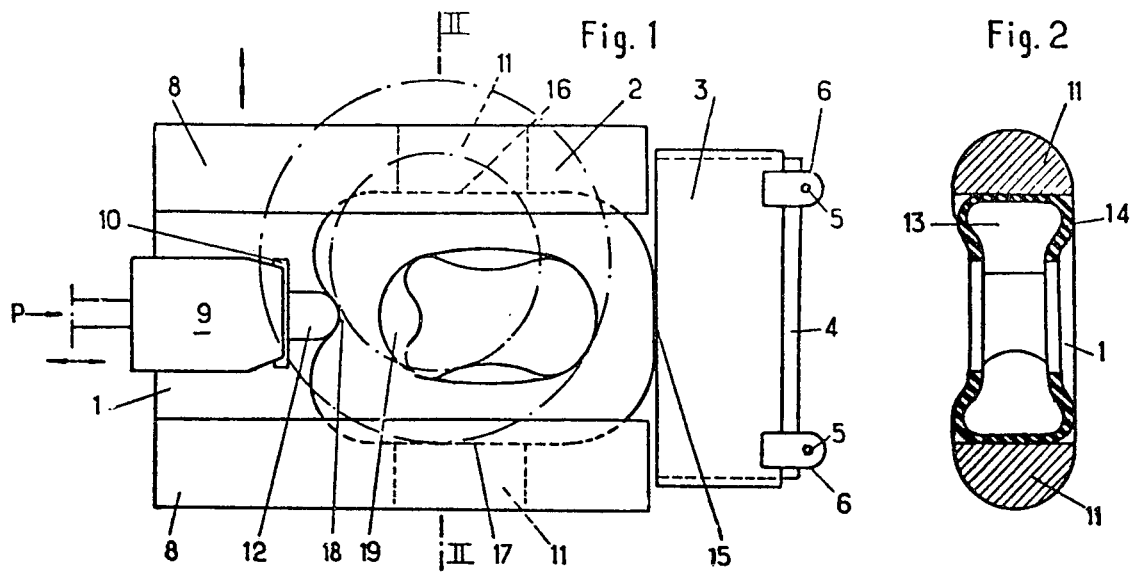
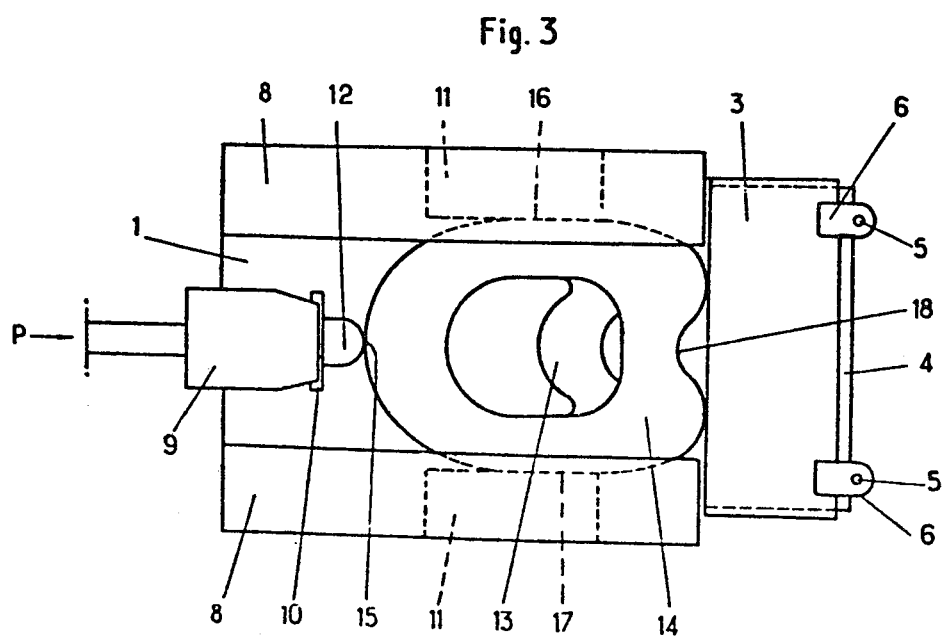

METHOD OF AND APPARATUS FOR REMOVING PUNCTURE-RESISTANT TUBES FROM TIRES

BACKGROUND OF THE INVENTION

This invention relates to a method of and to an apparatus for removal of puncture-resistant tubes from the tires in which they are mounted, in particular when the latter are worn, to permit reusing said tubes in new tires.

Tubes of the puncture-resistant type have an extremely high mechanical strength and benefit from the protection provided by the tires containing them, such that frequently the tire wears out and must be replaced while the puncture-resistant tube it contains is in perfect condition. It thus appeared useful to enhance the useful life-time of puncture-resistant tubes, which are relatively expensive, by removing them from the worn tires containing them, with a view to their reuse in new tires.

Since puncture-resistant tubes are generally made of a donut-shaped piece of molded rubber and have a plurality of independent cells inflated during manufacture to a given pressure, removal must be effected in a fashion such as not to damage the cells, which would release pressure and cause the tubes to lose their puncture-resistant characteristic, the resultant difficulty of the operation has meant that puncture-resistant tubes are not presently being removed from worn tires and then reused.

SUMMARY OF THE INVENTION

It is an object of the present invention to provide a method of removing puncture-resistant tubes from tires, which better meets practical needs than the techniques hitherto used.

It is another object of the present invention to provide a method of removing puncture-resistant tubes from worn tires with a view to reuse in new tires, hence enhancing the useful life-time of these tubes.

It is an additional object to provide an apparatus for removing puncture-resistant tubes from tires which is particularly suitable for carrying out the method of the invention.

In its method aspect, the present invention involves removing puncture-resistant tubes from tires by subjecting a tire, which contains a puncture-resistant type of tube to be removed, simultaneously to lateral squeezing pressure exerted on two diametrically opposite zones of the outer tire wall and to a thrusting action exerted on a zone of the outside tire wall situated in a plane perpendicular to the plane of squeezing, in order to cause the tube to begin to separate from the tire body, and then exerting a thrust on the zone diametrically opposite the first zone to which the thrusting action was applied, causing the tube progressively to emerge from the tire body.

According to an advantageous preferred variant of the method of the present invention, a lubricant is introduced into the interior of the tire body before subjecting the latter to the simultaneous squeezing and thrusting actions, to facilitate sliding between the tube and tire.

According to another advantageous preferred variant of the method of the present invention, the tire containing a puncture-resistant tube to be removed is held in place, while being subjected to the simultaneous squeezing and thrusting actions, by resting a portion of its outside wall, diametrically opposite the zone against which the thrusting force is being exerted, against a stationary thrust block or the like.

According to another advantageous variant of the method of the present invention, during the first step, the tire containing a tube to be removed, held in place by a portion of its outer wall being rested against a thrust block or the like, is subjected to the simultaneous squeezing action laterally on the outside diametrically opposite walls of the tire on both sides of the median plane of the tire, perpendicular to the above-mentioned thrust block or the like, and to a thrusting action against that portion of the tire wall diametrically opposite the portion which rests against the thrust block or the like, in order to cause the tube to begin to emerge from the tire body, and during a second step, the simultaneous above-mentioned squeezing and thrusting actions are interrupted, and the tire is made to pivot through an angle of about 180° to bring against the thrust block or the like that zone of the tire where the emergent portion of the tube is located, and, in a third step a simultaneous lateral squeezing action is exerted to bring toward one another the two opposite wall portions which are being subjected to the squeezing action, and a frontal thrusting action is exerted in the direction of the thrust block or the like, until the tube has been fully detached from the body.

In its apparatus aspect, the present invention is constituted by an apparatus for removing puncture-resistant tubes from tires. The apparatus includes, in combination, two symmetrical squeezing plates or the like, a jack disposed between the two squeezing plates in a plane parallel to the general lengthwise direction of these plates. A base plate, which furnishes lateral support for the tire is disposed transversely with respect to the squeezing plates. An accommodation for the tire whose tube is to be removed, is delimited by the squeezing plates or the like, the jack, and the aforementioned base plate, which provides lateral support for the tire and on which the squeezing plates or the like are slidably mounted.

According to an advantageous preferred variant the apparatus is combined with a tire-handling pulley arrangement positioned above the apparatus and in line with its axis.

According to another advantageous preferred variant of an apparatus according to the present invention, the jack is equipped with a nose to press against the tire.

According to another advantageous variant of an apparatus according to the present invention, the squeezing plates are provided with supporting means.

In addition to the above-mentioned features, the present invention in some of its preferred variants and embodiments, involves other features which are to become clear from the description hereinbelow.

BRIEF DESCRIPTION OF THE DRAWING

The present invention, in both its method and apparatus aspects, can be better understood with the aid of the specification hereinbelow.which refers to the attached drawing wherein:

FIG. 1 is a somewhat diagrammatic, top plan view of an exemplary embodiment of an apparatus for removing puncture-resistant tubes from tires according to the present invention, a tire being illustrated in position;

FIG. 2 is a cross sectional view of apparatus of FIG. 1, the section having been taken along section line II—II in FIG. 1; and FIG. 3 is a second, somewhat diagrammatic, top plan view of the apparatus of FIG. 1 during the operation of removing a tube from a tire, a tire being shown in position.

It should be understood, however, that the drawing figures and descriptive portions of the specification associated therewith are given solely to illustrate the present invention, and in no way constitute a limitation.

DETAILED DESCRIPTION OF THE PREFERRED EMBODIMENT

The illustrative embodiment of an apparatus, shown as a non-limitative example in the drawing figures, includes a base plate 1 designed to receive and provide lateral support for a tire generally designated by reference 2 and shown in phantom, from which the puncture-resistant tube which it contains is to be removed.

In the vicinity of one of its ends, the base plate 1 has a thrust block 3 with a backstop 4 which is held, for example, by removable rods 5 located in respective apertures formed in ears 6 which are fixedly connected to the thrust block 3. The base plate 1 is also equipped with and slidably supports two squeezing plates 8 disposed parallel to the lengthwise axis of the base plate 1. A jack 9 whose head 10 is positioned toward the block 3 of the base plate 1, the jack 9 being mounted on a frame (not shown) which also supports base plate 1, completes the basic apparatus according to the present invention.

The squeezing plates 8 have on their respective squeezing surfaces, respective bearing surfaces 11 for addressing diametrically opposed zones of the outer wall of a tire 2 on which the squeezing action of the plates 8 is to be exerted. A thrust head 10 of the jack 9 is also equipped with nose 12, which is to be pressed against a zone of the tire 2 opposite to that zone which is to be positioned against the thrust block 3, as visible in FIGS. 1 and 3.

Removal of puncture-resistant tube 13 from a body 14 of the tire 2 is accomplished in the apparatus of the present invention according to the technique described hereinbelow.

The tire 2, from which it is desired to remove the tube, is placed on the base plate 1 of the apparatus according to the present invention after introducing inside the tire a lubricant such as liquid soap (for example 10% soft soap in lukewarm water) by spreading the beads of the tire 2 properly to lubricate the surface of the tube 13 accommodated in the body 14 of the tire 2 and faciliate its sliding therein. Placement of the tire 2 on the base plate 1 of the removal apparatus according to the invention is then carried out when the squeezing plates 8 are spread as far apart as possible and the jack 9 is retracted. A zone 15 of the body 14 of the tire 2 is placed in contact with the thrust block 3. The tire 2 then being in place, the squeezing plates 8 are made to move toward one another with the aid of conventional means (not shown) such as a jack, for example, thus flattening and bringing together diametrically opposed zones 16 and 17 of the outer wall of the body 14, on which the plates 8 exert a squeezing force, while the jack 9 is activated to exert a thrusting force P by means of its nose 12 on a zone 18 of the outer wall of the body 14. This simultaneous action of squeezing by the plates 8 and thrusting by the jack 9, via its head 10 and nose 12 exerted on the tire 2 causes a portion 19 of the tube 13 to emerge from the body 14 of the tire 2. The action of the plates 8 and the jack 9 is then interrupted, and tire 2 whose tube 13 is then partially outside, is connected to a conventional pulley and belt (not shown) positioned above the apparatus. The plates 8 are then retracted and the jack 9 is moved rearwardly; then tire 2 is pivoted 180° to bring its zone 18, from which the emergent portion 19 of the tube 13 extends, to rest against the block 3. When the tire 2 is in place in this new position, the plates 8 are made to exert their squeezing action on the zones 16 and 17 of the body 14 of the tire 2 once again, while the jack 9 exerts its thrust action by means of its nose 12 on the zone 15 of the outer wall of the tire 2, thus causing complete removal of the tube 13 from the body 14 of the tire 2. The puncture-resistant tube 13 thus removed can then be inserted, with a view to reuse, into a new tire body with the aid of a conventional apparatus for insertion of puncture-resistant tubes into tire bodies, such apparatus being known per se.

It can be seen from the foregoing description that, whatever means of implementation, application, and performance are adopted, a method of and apparatus for removing puncture-resistant tubes from tires have been provided, which have important advantages, some of which were mentioned above, and other advantages which become apparent from utilization of these methods and apparatus for removing puncture-resistant tubes from the tires which contain them.

As may be seen from the description hereinabove and is to be understood, the invention is not confined to the specific elements and techniques of implementation, application, variants and embodiments illustrated which have been described more explicitly. On the contrary, the invention embraces all alternatives which may come to the mind of an expert in the field without departing from the framework or scope of the present invention, its scope being defined by the appended claims.

What is claimed is:

1. A method of removing puncture-resistant tubes from tires including a tire body having an outer wall, the method comprising:

subjecting a tire containing a puncture-resistant tube to be removed to the simultaneous action of lateral squeezing exerted on two diametrically opposite squeezing zones of the outer wall of the tire and to a thrusting action exerted on a zone of the outer wall of the tire located 90° from said squeezing zones, in order to cause the tube to begin to separate from the tire body, and thereafter subjecting the tire to a thrusting action exerted, during lateral squeezing on said squeezing zones, on a zone of the tire diametrically opposite the zone on which the thrusting action was first exerted, to cause the tube progressively to detach itself completely from the tire body.

2. A method according to claim 1, including lubricating the inside of the tire body before subjecting the tire to the simultaneous squeezing and thrusting actions, to facilitate sliding between the tube and the tire body.

3. A method according to claim 1, including resting a zone of the outer wall of the tire diametrically opposite the zone on which the thrusting action is being exerted against a support surface while subjecting the tire to each of the simultaneous squeezing and thrusting actions.

4. A method according to claim 1, including resting a zone of the tire against a support surface as a preliminary step, then firstly exerting on the tire containing a tube to be removed a simultaneous lateral squeezing force on the outer wall of the tire on the two diametrically opposite zones of the outer wall of the tire on both sides of the median plane of the tire, perpendicular to the support surface, and a frontal thrusting force against the zone of the outer wall of the tire perpendicular to the given plane and which is diametrically opposite that which rests against the support surface, to cause the tube to begin to detach itself from the tire body, interrupting the aforementioned simultaneous squeezing and thrusting action, pivoting said tire through an angle of about 180° to bring that portion of the tire where the detached portion of the tube is located against the support surface and, in a further step, again subjecting the tire to simultaneous action of a further lateral squeezing force to bring two opposite wall sections of the tire toward one another and a further frontal thrusting force in the direction of the support surface, until the tube is fully removed from the body of the tire.

5. An apparatus for removing puncture-resistant tubes from tires, comprising:

support means for supporting a tire containing a puncture resistant tube;

two squeezing means, one located on each of diametrically opposite sides of the tire while supported by said support means, for together applying a lateral squeezing force to the tire;

jack means, disposed adjacent the side of the tire located 90° from the positions of said squeezing means, for thrusting the outer wall of the tire; and thrust block means, disposed adjacent the side of the tire diametrically opposite said jack means, for preventing lateral motion of the tire during thrusting by said jack means.

6. An apparatus according to claim 5, wherein said two squeezing means comprise two symmetrical squeezing plates.

7. An apparatus according to claim 5, further in combination with tire-handling pulley means positioned above the apparatus and in line with its axis.

8. An apparatus according to claim 5, wherein said jack means comprises a jack equipped with a nose which is to contact the tire and exert a thrusting force thereto.

9. An apparatus according to claim 5, including squeezer support means for supporting said two squeezing means.

* * * * *